Sept. 23, 1924.
J. C. HULL
1,509,208
PROCESS AND SYSTEM OF APPLYING INSECTICIDES
Filed June 6, 1922
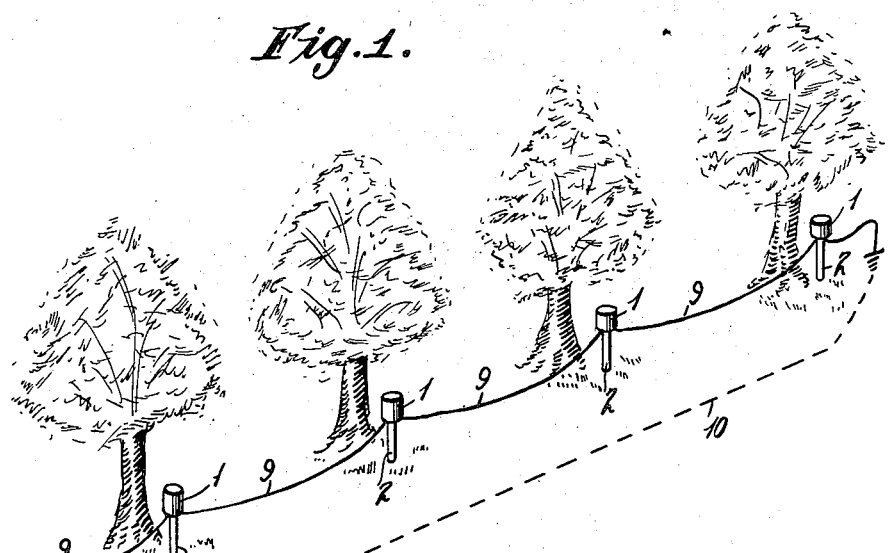
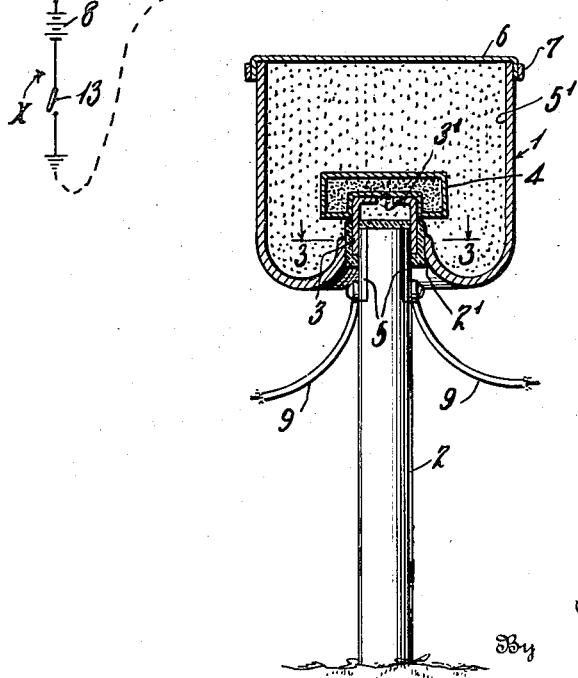
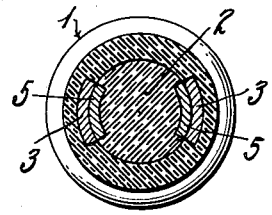
Inventor
John C. Hull
By Bacon & Thomas
Attorneys Patented Sept. 23, 1924.

1,509,208

UNITED STATES PATENT OFFICE.

JOHN C. HULL, OF GASPORT, NEW YORK.

PROCESS AND SYSTEM OF APPLYING INSECTICIDES.

Application filed June 6, 1922. Serial No. 566,436.

*To all whom it may concern:*

Be it known that I, JOHN C. HULL, citizen of the United States, residing at Gasport, in the county of Niagara and State of New York, have invented certain new and useful Improvements in Processes and Systems of Applying Insecticides, of which the following is a specification.

The invention relates to an improved method of applying insecticide to the foliage of fruit trees, and other plant life.

It is a general practice among fruit growers to spray orchards with machines carrying an insecticide solution which is thrown upon the foliage in liquid form. In applying insecticide the application thereof for the utmost efficiency must be within certain narrow limits, that is when the climatic conditions are most favorable, for instance, when there is very little or a gentle breeze so that the insecticide will remain on the foliage. Machines have been satisfactory in their use where a level orchard is being treated, but with mountain side orchards it is difficult to use a machine, and it has long been recognized that it would be an advance in this art if a system could be devised by which a multitude of trees could be instantaneously treated at any desirable period.

The invention therefore broadly aims to provide a system of simultaneously applying to a plurality of trees, an insecticide and controlling the application of an insecticide from a centralized point.

With the foregoing conception in mind the invention broadly comprehends a means of applying insecticides to trees embodying a plurality of containers adapted to be positioned adjacent trees or plants in an orchard. Each container receives a given supply of an insecticide and also a dynamite or other explosive cartridge, the containers being all arranged in a single electrical circuit, controlled from a distant point by one or more switches. whereby the fruit grower upon observing that climatic conditions are satisfactory for the application of an insecticide to the trees, closes the switch instantaneously causing an explosion of the dynamite caps within all of the containers, which drives the insecticide through a weakened cover on each container with explosive violence on the foliage of the trees. The containers are removable, and after the application of a charge may be again refilled and placed on designated supports having electrical connections for reuse.

In the accompanying drawings I have shown one embodiment of my invention, but it will be understood that the method is capable of being carried out in other manners, and that other energies instead of an electrical energy may be employed for simultaneously applying the insecticide from a plurality of containers by controlling means located at a distant point.

In the drawings, Figure 1 represents a series of my devices installed adjacent an equal number of trees; Figure 2 is a vertical cross section of the device; and Fig. 3 is a cross section of the device taken on the line 3—3 of Figure 2.

Referring now more particularly to the drawings wherein like reference characters designate corresponding parts, the numeral 1 designates a plurality of containers, which are placed in various positions adjacent trees or the like, as indicated in Figure 1 of the drawings, and are preferably supported upon standards 2 that may be attached to the trees or mounted upon separate supports adjacent a tree. Inasmuch as each container and standard is of a like construction a description of one will suffice for all. Each container is preferably formed of metal or the like, and has an open ended socket 2 in the under side thereof. The walls of the socket carry electrical contacts 3 extending up into a dynamite cap receiver into which there is placed a dynamite cap 4 or other explosive material adapted to be ignited by the wires 5, one connecting with the contacts 2 and the other grounded to the bomb, the edges being spaced to provide the gap 3' for igniting the cap. An enlarged pocket 5' is formed in each container into which any conventional insecticide, preferably in powdered form, is placed, the quantity of the insecticide varying in accordance with the use of the bomb. The upper portion of the container is normally open and is closed by a fragile paraffine or other waterproof cap 6 retained in place by a flexible band 7 uniting the cap to the other end of the container, but the cap, of course, is punctured when an explosion occurs in the container allowing the insecticide to be thrown from the container with explosive violence onto the foliage of each tree. Each standard or support 2 is preferably inclined or the walls of each socket likewise inclined so that the containers or bombs are detachably seated in position. The explosion of the material in each container or bomb, however, does not disturb its mounting.

A plurality of these bombs or containers all filled, are placed upon their standards and between adjacent standards a current travels from a source of supply 8 which may be a storage battery or the like through the wires 9, connected with contacts on the posts or standards 2 and through the ground wires 10, in a manner well known to all skilled in the passage of an electrical current to a plurality of objects.

Located at the point X, which in actual use may be a controlling house or the residence of the fruit grower, is a switch 13, which when closed, causes a travel of the current through the wires 9 and 10. The switch is, of course, normally open. When the invention is in actual use a plurality of the bombs are applied to their wired standards and wiring is, of course, such that there is an electrical connection between each bomb and standard by reason of the contacts on the standard and the spring contacts 3 carried by the bombs. The fruit grower may then at any time by closing the switch ignite instantly the dynamite or other explosive cartridges in each container or bomb which results in the throwing by explosive violence of an insecticide upon all of the trees of an orchard. It is appreciated that the time limit in which a dry insecticide may be applied is often exceedingly short. In other words, such climatic conditions as will permit a most favorable application of the insecticide may only occur for a few minutes in a day or week during the period when it is vital that the insecticide should be applied to the foliage if an enlarged yield of fruit is to be obtained. With this invention the operator may watch for such climatic conditions, observe them, and by closing the switch 13 the electrical energy passes to each post, through the contacts 3 in each bomb or container, and ignites the explosive cartridge contained therein. All of the cartridges are simultaneously exploded so that the entire orchard is at once treated with an insecticide. It will therefore be appreciated that by the use of this invention, if the desirable period for the application of the insecticide should be decidedly short as frequently happens, that an entire orchard may be treated inasmuch as the explosion of all of the bombs simultaneously and on an instant's notice permits such application of the treating substances to the trees.

When an orchard or the like has been thus treated by the explosion of the cartridges in the containers or bombs, a laborer merely removes the bombs from their standards or supports, brings them to a filling house, if necessary, or fills them on the field with new cartridges and a supply of an insecticide, applying new fragile caps 6 and retaining rings 7. The bombs are again placed on their standards and ready for further use.

Having thus described my invention, what I claim is:

1. An insecticide container, comprising a casing having a socket therein, said casing being adapted to receive a charge of insecticide material and an explosive substance, and contacts adjacent the walls of said socket having terminals adapted to enter the container to ignite the explosive substance when an electrical current is conveyed to said contacts.

2. An insecticide container, comprising a casing having a socket therein, said casing being adapted to receive a charge of insecticide material and an explosive substance, and contacts adjacent the walls of said socket having terminals adapted to enter the container to ignite the explosive substances when an electrical current is conveyed to said contacts, said container being open at one end, and a fragile cover adapted to close said container and to release the insecticide when the explosive substance is ignited by being ruptured by explosive violence.

In testimony whereof I affix my signature

JOHN C. HULL